United States Patent [19]

Friedenberg et al.

[11] 4,177,674
[45] Dec. 11, 1979

[54] SPREADER APPLICATION RATE MONITORING DEVICE

[75] Inventors: Leonald W. Friedenberg; James A. Baker, both of Edmonton, Canada

[73] Assignee: Baker Engineering Enterprises Ltd., Edmonton, Canada

[21] Appl. No.: 899,541

[22] Filed: Apr. 24, 1978

[51] Int. Cl.² .............. B05B 12/00; G01F 15/06
[52] U.S. Cl. .............................. 73/198; 222/614
[58] Field of Search .............. 222/613, 614, 624, 617; 239/155, 156, 157; 335/205; 73/198

[56] References Cited

U.S. PATENT DOCUMENTS

| 3,249,713 | 7/1961 | Briggs | 335/205 |
| 3,782,634 | 1/1974 | Herman | 239/156 |
| 4,023,020 | 5/1977 | Lesheadet | 239/155 |
| 4,052,003 | 10/1977 | Steffen | 239/155 X |

Primary Examiner—Daniel M. Yasich
Attorney, Agent, or Firm—Ernest Peter Johnson

[57] ABSTRACT

An application monitoring device to determine and display the volume of liquid or granular material applied per unit area of ground by mobile application equipment is described. The device includes a first measuring means which generates an area electrical pulse signal having a frequency proportional to the rate at which the application equipment covers or traverses a unit of area, and a second measuring means which generates a volume electrical pulse signal having a frequency proportional to the rate of application of the material. A frequency multiplying means operates on the electrical a pulse signal of the first measuring means, and a pulse counting device connected to the output of the frequency multiplying means and the second measuring means accumulates the electrical pulses from the second measuring means for a period of time determined by the frequency multiplying means and corresponding to the time required by said application equipment to cover a unit of area. Display means indicate the above accumulated value of pulses which is a measure of the volume of material applied per unit area.

3 Claims, 4 Drawing Figures

SPREADER APPLICATION RATE MONITORING DEVICE

REFERENCE TO COMPANION APPLICATION

This application is a companion application to U.S. Application Ser. No. 899,542 filed Apr. 24, 1978, in the names of Leonald W. Friedenberg et al entitled "Application Rate Monitor Device".

BACKGROUND OF THE INVENTION

This invention relates to a device for monitoring the volume of liquid or granular material applied per unit area by mobile application equipment. The device is used to determine and display the volume of material, such as pesticides or fertilizers, being applied per unit area to the field, so that the operator of the application equipment can make adjustments to the equipment in order to maintain the desired application volume per unit area.

The prior art method of determining the application volume per unit area of liquid pesticides for example, involves the measurement of a test area in the field and the measurement of the amount of material used during application on the test area. An odometer may be used to measure the test area and a totalizing type flow meter may be used to measure the amount of material applied to the test area. These two measurements are used by the operator to calculate the application volume per unit area over the test area.

SUMMARY OF THE INVENTION

The device of the present invention uses an area measuring transducer to provide an electrical signal proportional to the rate at which a unit of area is covered or traversed by the application equipment and a liquid or granular flow transducer to provide an electrical signal proportional to the rate of liquid or granular material being applied to the field. The electrical signals from these two transducers are used to electrically calculate and then display the value of the volume of material applied per unit area.

An analog device for determining the application rate was investigated but the response time was found to be slow and it was difficult to obtain a stable reading unless the number of pulses per second produced by each transducer was almost identical. This device involved the conversion of the signals from the transducers to analog voltages which were divided by an analog multiplier in order to produce an analog voltage proportional to the application volume per unit area. Due to the variety of equipment and operating conditions which may be encountered by such a monitoring device, an alternate device was sought. The device of the present invention uses a digital calculating method and provides an adequate speed of response and stable readings regardless of the number of pulses per second produced by each transducer.

The invention provides an application monitor which comprises first measuring means for attachment to the application equipment for generating an area electrical pulse signal having a frequency that is proportional to the rate at which a unit of area is covered by the application equipment. Second measuring means are provided for attachment to the flow measuring means for generating a volume electrical pulse signal having a frequency that is proportional to the rate at which material is applied by the application equipment. The output of the first measuring means is operated on by frequency multiplying means, and pulse counting means connected to the output of the frequency multiplying means and the second measuring means accumulates the electrical pulses from the second measuring means for a period of time determined by the frequency multiplying means and corresponding to the time required by said application equipment to cover a unit of area. Display means connected to the output of the pulse counting means indicate the accumulated value of pulses in said pulse counting means, the accumulated value being proportional to the volume of material applied per unit area.

Broadly stated, this invention provides a device for monitoring the volume of liquid or granular material applied per unit area by mobile application equipment having flow measuring means comprising: first (a) measuring means for attachment to the application equipment for generating an area electrical pulse signal which have a frequency that is proportional to the rate at which a unit of area is covered by said application equipment; (b) second measuring means for attachment to the flow measuring means for generating a volume electrical pulse signal which have a frequency that is proportional to the rate at which material is applied by said application equipment; frequency (c) multiplying means for operating on the electrical pulses from said first measuring means to produce electrical pulses having a frequency which is a multiple of the frequency of the pulses generated by the first measuring means; pulse counting (d) means connected to the frequency multiplying means and the second measuring means for accumulating the electrical pulses from the second measuring means for a period of time determined by the frequency multiplying means and corresponding to the time required by said application equipment to traverse a unit of area; and (e) display means connected to the pulse counting means for indicating the accumulated value of pulses in said pulse counting means, the accumulated value being proportional to the volume of material applied per unit area.

DESCRIPTION OF THE DRAWINGS

Other objects features and advantages of the present invention will become more fully apparent from the following detailed description of the preferred embodiment, the appended claims and the accompanying drawings in which:

DESCRIPTION OF THE PREFERRED EMBODIMENT OF THE INVENTION

Figure 1:
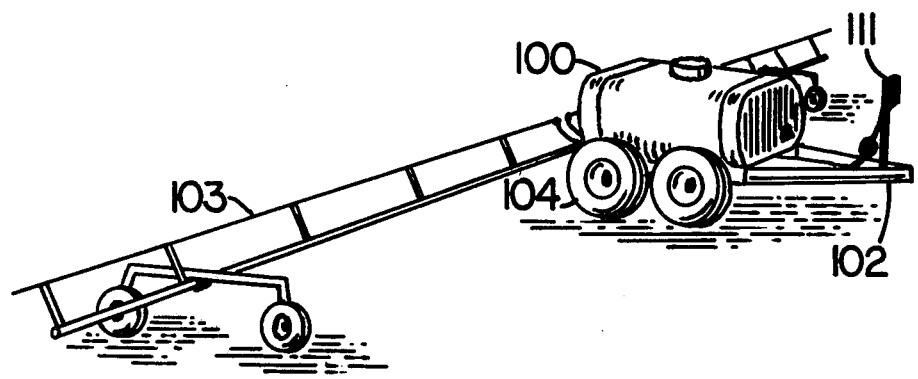
FIG. 1 illustrates application equipment which may be used for spraying a field with liquid material.

As shown in FIG. 1, the invention is used in connection with known wheeled application equipment. This equipment normally comprises a storage tank 100 mounted on a trailer 102 which draws a spray boom 103. Material, such as liquid fertilizer, is pumped or otherwise removed from the storage tank and conveyed through a suitable piping or conduit system into the spray boom, from which it is applied to the field.

In general, the application monitor comprises: first measuring means 1 for generating an area electrical pulse signal 5 having a frequency proportional to the rate at which the application equipment covers a unit of area; second measuring means 2 for producing a volume electrical pulse signal having a frequency that is proportional to the rate at which material is applied; frequency multiplying means 7 for operating on the output of the first measuring means to produce electrical pulses having a frequency which is a multiple of the frequency of the pulses generated by the first measuring means; pulse counting means 10 connected to the output of the frequency multiplying means and of the second measuring means for accumulating the electrical pulses 6 from the second measuring means for a period of time equal to the period of the signal from the frequency multiplying means which corresponds to the time required by said application equipment to cover a unit of area; and display means 4 connected to the output of the pulse counting means for indicating the accumulated value of pulses in said pulse counting means, the accumulated value being proportional to the volume of material applied per unit area.

In the preferred embodiment, the first measuring means comprises one or more magnets mounted on a wheel 104 of the trailer 102. As the wheel rotates, the magnet or magnets activate an electromagnetic detector or transducer which generates electrical pulses 5 having a frequency proportional to the rate of rotation of the wheel. The wheel being attached to the application equipment and allowed to roll on the ground will rotate at a rate proportional to the rate at which the equipment covers a unit of area. The period of the area electrical signal 5 is proportional to the time required for the application equipment to cover one unit of area. The size of the unit of area depends on three factors: the width of the equipment, the circumference of the wheel, and the number of electrical pulses produced per revolution of the wheel.

Figure 2:
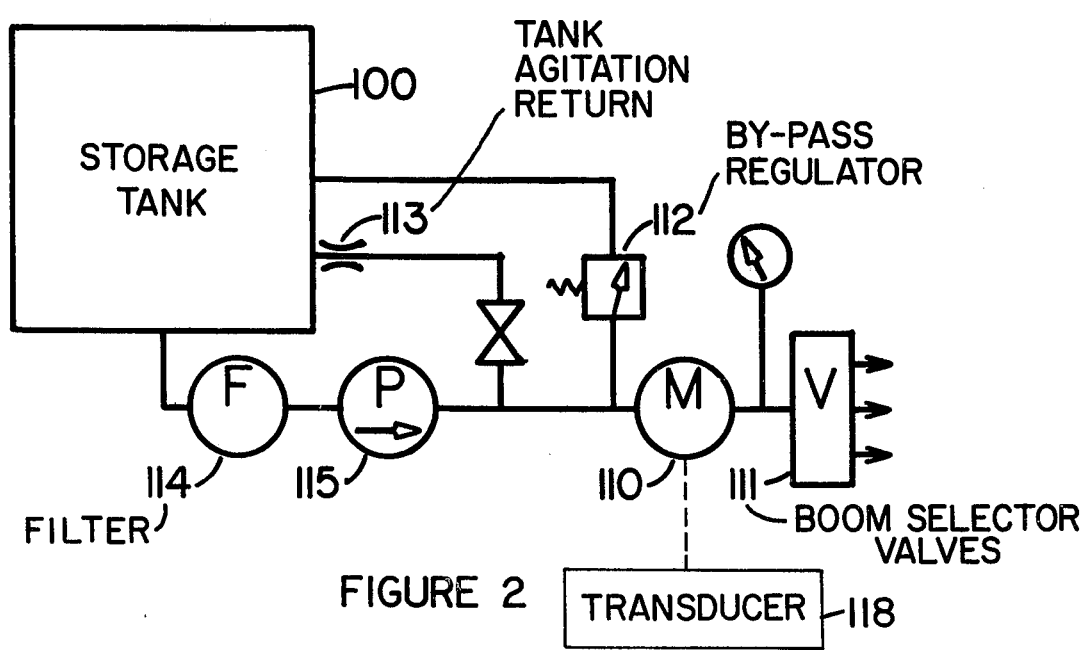
FIG. 2 is a schematic diagram of a conventional sprayer system associated with the application equipment of FIG. 1.
Figure 3:
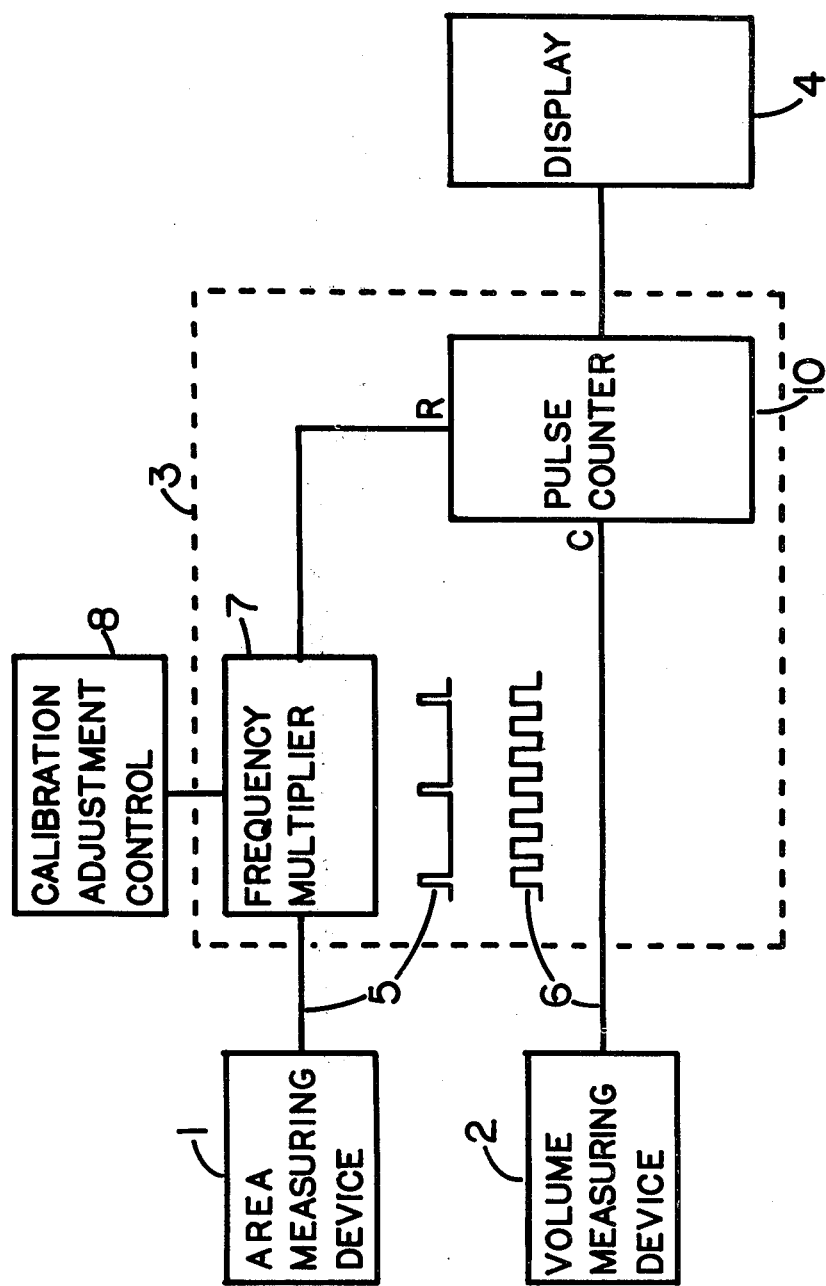
FIG. 3 is a block diagram of an application rate monitor showing functional blocks and additionally showing the nature of electrical signals present in various parts of the circuitry.

FIG. 2 illustrates a liquid sprayer system which may be used in conjunction with the present invention. In this preferred embodiment, the volume measuring means 2 comprises a mechanical flow meter 110 to which a mechanical to electrical transducer 118 is fastened to generate electrical pulses 6 having a frequency proportional to the rate of application of the liquid. The flow meter 110 is positioned before the boom selector valves 111 but after the bypass regulator 112, the tank agitation return 113, the filter 114 and the pump 115. The volume electrical signal generated by the flow meter transducer 118 has a period proportional to the time required by the application equipment to apply one unit of volume of material. Hence each electrical pulse represents one unit of volume of material applied to the field. The size of the unit of volume depends on the design of the flow meter.

Thus, fluid from storage tank 100 is pumped to the spray means on the boom 103 via filter 114, pump 115, mechanical flow meter 110, and boom selector valves 111, the volume electric pulse signal being generated by transducer 118 as a function of the flow of liquid through the flow meter 110.

In the preferred embodiment, the frequency of the area electrical signal 5 from the area measuring means 1 is multiplied in a frequency multiplier 7 by a calibration factor that is determined from the size of the unit of area and the size of the unit of volume. The calibration factor may be adjusted by a calibration adjustment control 8.

The train of electrical pulses 6 from the second measuring means 2 is accumulated in a pulse counter 10 for the period of one unit of area. This period is determined by the period of the pulses generated by the frequency multiplier 7. The number of pulses totalized during this period corresponds to the application rate in units of volume per unit of area. At the end of this period, the accumulated value in the counter is displayed and the counter is reset to zero. The counter will again accumulate pulses from the second measuring means while the application equipment is covering the next unit of area.

Figure 4:
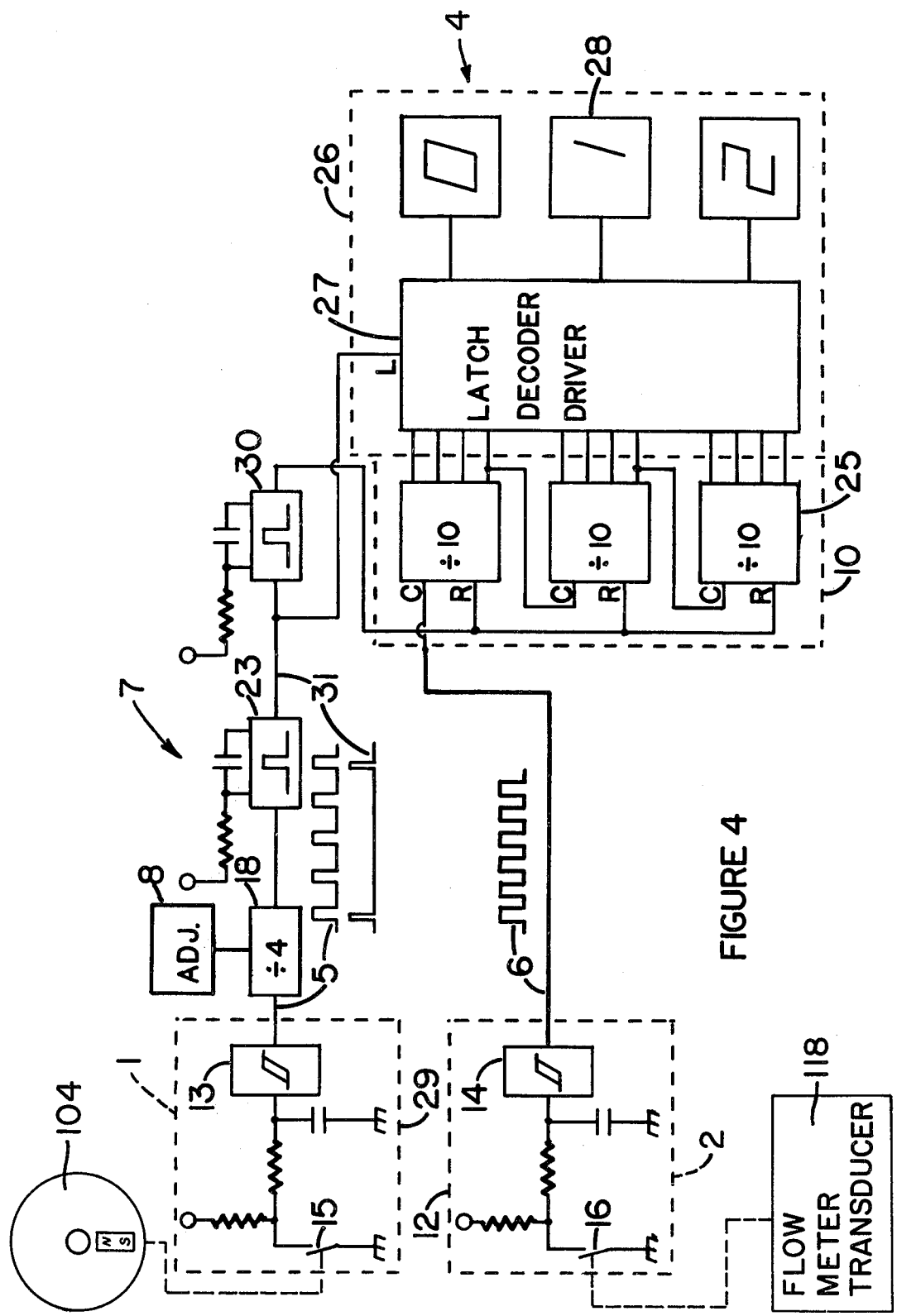
FIG. 4 is a schematic diagram of the preferred embodiment of the present invention showing details of said functional blocks and additionally showing electrical signals present in various parts of the circuitry.

FIG. 4 illustrates the preferred embodiment of the present invention in greater detail. The area measuring means 1 enclosed by the broken line 29, incorporates a switch 15 which closes and opens as the measuring wheel 104 rotates. A Schmitt trigger 13 is used to produce a train of pulses 5 free of contact bounce and other electrical interference. Similarly, the volume measuring means 2, enclosed by the broken line 12, incorporates a switch 16 which closes and opens as the flow meter transducer is operated by material being applied by the application equipment. A second Schmitt trigger 14 is used to produce a train of pulses 6 free of contact bounce and other electrical interference. The frequency multiplying means 7 consists of a divide-by-N pulse counter 18 operating on the train of pulses 5 produced by the first Schmitt trigger 13. The calibration adjustment control 8 may be used to adjust the value of N of the divide-by-N pulse counter 18. The accumulated binary coded decimal value of the pulses from the second measuring means is latched into the display 4, enclosed by broken line 26, by a pulse 31 generated by a monostable multivibrator 23 when the pulse counter 18 indicates that one unit of area has been covered by the application equipment. After said latch is energized, the decade counters 25 are reset to zero by a monostable multivibrator 30. The latch, decoder and display driver 27 then operate a readout device 28. The various components of the circuit of FIG. 4 are conventional in the art. For example, the frequency multiplier and calibration means may be an integrated circuit device such as that described as Model No. MC 14527B, Motorola Semiconductor Data Library Volume 5/Series B, 1976.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. Apparatus for monitoring the volume of fluent material applied per unit area by mobile application equipment, including a storage tank (100), dispensing means (111), and conduit means connecting the tank with the dispensing means, comprising
    (a) first measuring means (1) operatively connected with the mobile application equipment for generating an area electrical pulse signal (5) having a frequency proportional to the rate at which a unit of area is traversed by the application equipment;

(b) second measuring means (2) including flow measuring means (110; 118) operatively connected in the conduit means for generating a volume electrical pulse signal having a frequency proportional to the rate at which a unit of volume of the material is applied by the application equipment;

(c) electrical circuit means including frequency multiplying means (7) and calibration adjustment means (8) for multiplying at least one of said area and volume pulse signals by a calibration factor that is determined from the size of at least one of the units of area and volume;

(d) pulse counting means (10) for accumulating pulses derived from said frequency multiplying means which are a function of the volume electrical pulse signal (6) for a period of time which is a function of the area electrical pulse signal (5); and (e) display means (4) connected with said pulse counting means for indicating the number of pulses accumulated in said pulse counting means, whereby the resultant accumulated pulse value is proportional to the volume of material applied per unit area.

2. A device as set forth in claim 1 wherein the first measuring means is attached to a wheel associated with the application equipment.

3. Apparatus as defined in claim 1, wherein said frequency multiplying means is operable to multiply the frequency of said area electrical pulse signal.

* * * * *